Patented Feb. 16, 1937

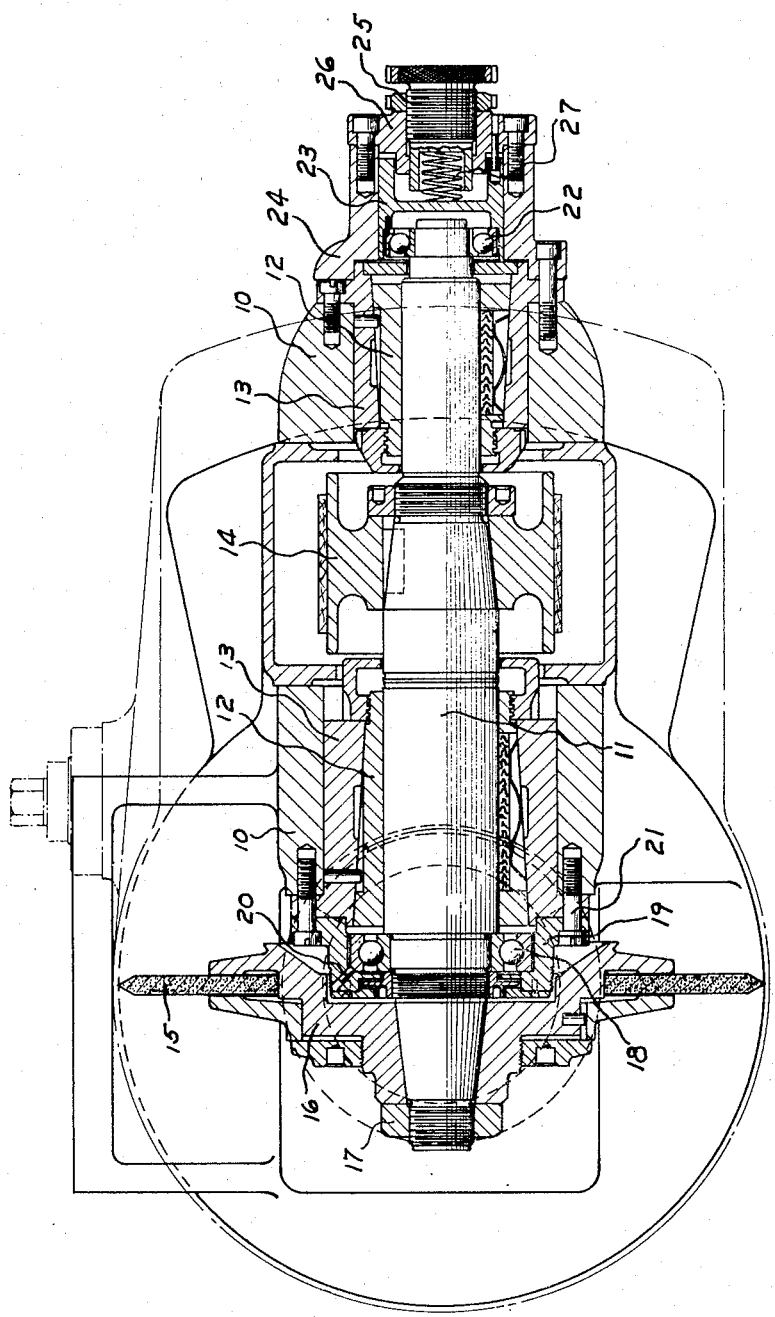

2,071,200

UNITED STATES PATENT OFFICE 2,071,200

ROTARY SPINDLE MOUNTING

Alden M. Drake, West Hartford, Conn., assignor, by mesne assignments, to Niles-Bement-Pond Company, New York, N. Y., a corporation of New Jersey Application October 20, 1933, Serial No. 694,414

2 Claims. (Cl. 308—35)

This invention relates to spindle mounting means adapted for supporting a grinding wheel within a wheel supporting head particularly adapted for precision screw thread grinding machines.

An object of the present invention is to provide an improved spindle construction and mounting particularly adapted for mounting a rotating grinding wheel for screw threads, the work engaging surfaces of which are maintained against movement laterally relative to the head.

One feature that enables me to accomplish the above named object is that the wheel spindle is supported against radial thrusts by plain cylindrical bearings and against axial thrust in either direction by an anti-friction bearing mounted closely adjacent the wheel end of the spindle.

Another object of the invention is to provide a grinding wheel mounting spindle, the position of the grinding surfaces of which are maintained in accurate predetermined position over a wide range of temperatures so that the position of the grinding surfaces of the wheel will not be subject to change due to expansion of the spindle occasioned by heat.

And finally it is another object of the invention to provide a housing for the axial thrust bearing adjacent the wheel end of the spindle and to provide a resiliently movable bearing at the opposite end of the spindle which may be pressed constantly by a suitable spring to maintain the thrust always in the same direction.

With the above and other objects in view my invention includes the features of construction and operation set forth in the following specification and illustrated in the accompanying drawing.

In the accompanying drawing annexed hereto and forming a part of this specification, I have shown my invention embodied in a wheel spindle for thread grinding machines but it will be understood that the invention can be otherwise embodied and that the drawing is not to be construed as defining or limiting the scope of the invention, the claims appended to this specification being relied upon for that purpose.

The figure of the drawing shows a longitudinal sectional view of a complete grinding wheel spindle and supporting means therefor.

In the above mentioned drawing I have shown but one embodiment of the invention which is now deemed preferable but it is to be understood that changes and modifications may be made within the scope of the appended claims without departing from the spirit of the invention.

Briefly and in its preferred aspect my invention may include the following principal parts: First, a wheel head provided with spaced bearing receiving openings within which are mounted adjustable cylindrical bearings. Between these bearings may be mounted the spindle driving means such as a pulley keyed directly to the spindle. A wheel supporting and mounting chuck or holder is mounted upon one end of the spindle preferably by means permitting ready removal and substitution of different types of grinding wheels. Closely adjacent the wheel chuck is a thrust bearing preferably of the anti-friction or ball bearing type, the inner race of which is secured directly upon the spindle and the outer race retained in a collar member securely fastened upon one end face of the spindle supporting head. At the opposite end of the spindle is a second anti-friction bearing the inner race of which is secured directly upon the spindle and the outer race is mounted within a slidably disposed member within a portion of the head and resiliently forced axially of the spindle in one direction.

Referring more in detail to the figures of the drawing, I provide a wheel head 10, the one shown being adapted for angular adjustment about an axis intersecting and at right angles to the axis of the spindle 11. Within this head 10 is disposed the wheel supporting and rotating spindle 11, the spindle 11 being provided with two spaced cylindrical bearing surfaces adapted to engage cylindrical bearings 12 adjustably disposed within suitable recesses of the head 10. As the particular type of cylindrical bearings is not a part of the invention and may be of any well-known type, it is not thought that further description will be necessary. In the drawing the bearings 12 have conical outer surfaces engaging corresponding surfaces of sleeve members 13 supported within the head 10. Disposed between the two bearings 12 and mounted directly upon and keyed to the spindle 11 is a driving pulley 14 by means of which the spindle 11 may be rotated at any desired high speeds.

At one end of the spindle 11 the spindle is tapered upon which tapered portion may be mounted a grinding wheel 15 held within a chuck or holder 16, a nut 17 threaded upon the extended threaded end of the spindle 11 serving to retain this wheel mounting 16 and wheel 15 in place. Between the wheel mounting 16 and the bearing 12 adjacent the wheel 15 is disposed an anti-friction bearing 18 housed within a collar member 19 secured to the front end face of the head 10 and surrounding the spindle 11. The outer race of this bearing 18 which is retained firmly within the collar member 19 is positively prevented from rotation by provision of a suitable key or pin 20. The inner race is mounted directly on the spindle 11. The collar member 19 may be secured to the supporting head 10 by means of screws 21 passing through the flange of the front sleeve member 13 for the spindle bearing 12.

At the opposite end of the spindle 11 beyond the cylindrical bearing 12 at that end is a second anti-friction bearing 22. The outer race of this bearing 22 is housed within a sleeve member 23 slidable co-axially with the spindle 11 within a member 24 secured to and forming an extension of the head 10. The inner face of bearing 22 is secured rigidly upon the spindle 11 so that movements of the outer race of bearing 22 and its supporting member 23 may serve to force the spindle 11 toward the wheel end and to force the thrust bearing 18 at that end toward the inward extending flange of the collar member 19. In order to continually force member 23 in this direction a nut 25 is threaded within an end member 26 on the extension 24 within which is disposed a compression spring 27 the outer end of which engages the sleeve member 23. By adjustment of the nut 25 the pressure of the spring 27 forcing the sleeve member 23 and spindle 11 and cooperating parts toward the wheel end of the spindle 11 may be adjusted to any predetermined amount.

What I claim is:

1. A rotary spindle construction and mounting therefor comprising in combination, a head, a rotatably mounted spindle therein, spaced cylindrical bearings for said spindle, conical seats for said bearings adjustable axially to compensate for wear, driving means for said spindle disposed between the bearings, an anti-friction thrust bearing adjacent one end of the spindle, a collar member having a shoulder thereon secured to said head and housing said thrust bearing, a thrust bearing adjacent the opposite end of the shaft slidably supported within said head, and resiliently acting means to force said bearing and said spindle axially in a direction to force said thrust bearing against said shoulder.

2. A rotary spindle construction and mounting therefor comprising in combination, a head, a rotatably mounted spindle therein, spaced cylindrical bearings for said spindle, conical seats for said bearings adjustable axially to compensate for wear, driving means for said spindle disposed between the bearings, a thrust bearing adjacent one end of the spindle, a collar member having a shoulder thereon fixed to said head and surrounding said spindle adjacent the end within which said thrust bearing is housed, a second bearing adjacent the opposite end of the shaft slidably supported within said head, and resiliently acting means to force said thrust bearing and said spindle axially in a direction whereby said thrust bearing will be forced against the shoulder of said collar member.

ALDEN M. DRAKE.